3,179,495
LITHIUM FLUORIDE PRODUCTION
Robert D. Goodenough, Midland, Mich., assignor to The Dow Chemical Company, Midland, Mich., a corporation of Delaware
No Drawing. Filed Apr. 1, 1963, Ser. No. 269,704
5 Claims. (Cl. 23—88)

This invention relates to an improved method of producing lithium fluoride. More particularly, this invention relates to an improved method of producing lithium fluoride from a lithium-containing solution such as that which results when lithium value is eluted from an acid cation exchange resin.

A method of extracting lithium from lithium bearing ores has been suggested in U.S. Patent 2,980,499. In the method therein proposed, lithium is recovered from its acid soluble ores by mixing a quantity of ore with liquid water and a strongly acidic cation exchange resin. After separating the resin from the gangue, the resin may be eluted with an acid such as sulfuric, nitric, hydrobromic, hydriodic or hydrochloric, or a hydroxide such as potassium hydroxide or sodium hydroxide, thereby forming an aqueous solution of the corresponding lithium salt or hydroxide.

It is an object of this invention to provide a method of producing substantially pure lithium fluoride from a lithium-containing aqueous solution.

It is another object of this invention to provide a method of producing lithium fluoride which is relatively inexpensive in operation when compared with other methods.

Other objects and advantages of the present invention will become apparent in the course of the following specification.

The objects and advantages of the present invention may be obtained by hydrolyzing a soluble silicofluoride such as fluosilicic acid ($H_2SiF_6$), sodium silicofluoride ($Na_2SiF_6$), potassium silicofluoride ($K_2SiF_6$), or ammonium silicofluoride ($(NH_4)_2SiF_6$) with a basic aqueous solution such as one containing sodium hydroxide, ammonium hydroxide, potassium hydroxide, potassium carbonate, or sodium carbonate, and removing precipitated silica ($SiO_2$) thus formed, thereby leaving an aqueous solution of a fluoride salt such as sodium fluoride, potassium fluoride or ammonium fluoride. With the fluoride-containing solution thus formed is mixed an aqueous solution of soluble lithium salt or hydroxide such as that obtained by eluting lithium value from a strongly acidic cation exchange resin. Lithium fluoride, in substantially pure form, is then recovered as a precipitate from the aqueous mixture.

Hydrolysis of the soluble silicofluoride solution is usually carried out at a temperature of from about 50 degrees centigrade to the boiling point at the pressure employed, and preferably from about 80 to about 85 degrees centigrade. Temperatures lower than about 50 degrees centigrade usually result in a silica gel formation which would tend to trap some of the fluoride salts formed and would thus be undesirable. Boiling tends to agitate the precipitated silica, thus making separation of product from the solution difficult, and is therefore undesirable.

A preferred technique for hydrolysis of the soluble silicofluoride is performed by adding aqueous basic solution, as hereinbefore described, to an aqueous solution of soluble silicofluoride dropwise to the phenolphthalein end point which is ordinarily a pH of from about 9.3 to about 10.6. In this manner, an approximately stoichiometric amount of base may be conveniently added to the soluble silicofluoride solution. Silica ($SiO_2$) formed by the hydrolysis reaction may be removed as by filtering. A preferred soluble silicofluoride is sodium silicofluoride. Preference for this soluble silicofluoride is generally based on the fact that soduim silicofluoride is usually obtainable as a waste or by-product in the phosphate industry. Thus, it is cheap and readily available.

An aqueous solution containing lithium ion may be obtained as by eluting a strongly acidic cation exchange resin loaded with lithium ions in accordance with the procedure outlined in U.S. Patent 2,980,499. To this lithium-ion containing solution is added the fluoride-ion containing solution obtained above by hydrolysis of a silicofluoride. Usually an amount of from about 5 to about 15 percent in excess of the stoichiometric amount of fluoride-ion containing solution is used. Preferably an amount of fluoride-ion containing solution of about 10 percent in excess of the stoichiometric amount is added. The solution mixture should be maintained at a temperature of from about 50 degrees centigrade to the boiling point at the pressure employed, and preferably from about 80 to about 85 degrees centigrade. At temperatures below about 50 degrees centigrade, the solubility of lithium fluoride tends to become appreciable, and hydrates of the soluble material in solution tend to form, thereby enhancing the possibility of product contamination by precipitation of the hydrates. Boiling ordinarily renders separation of lithium fluoride product difficult because of agitation and is therefore undesirable.

The lithium fluoride product of the present process recovered as a precipitate, is substantially pure. When appropriate care is taken, the lithium fluoride product contains only trace amounts of other fluoride, silicofluoride or meta-silicate salts. It may be seen that the process of the present invention is particularly useful when used as a further recovery step from the ion exchange method of recovering lithium value as set forth in U.S. Patent 2,980,499.

The following examples are set forth to illustrate and are not to be construed to limit the present invention.

*Example 1*

A solution was prepared by adding 1.8768 grams of technical grade sodium silicofluoride to about 125 milliliters of water maintained at a temperature of 80 to 85 degrees centigrade. To this solution were added 39.81 milliliters of one normal sodium hydroxide. This corresponded to the phenolphthalein end point. Silica was filtered off and washed with 25 milliliters of warm water, the washings being combined with the filtrate. The resulting sodium fluoride solution formed by the above reaction was added to an aqueous solution containing the equivalent of 3.84 grams of lithium sulfate obtained by eluting, with sulfuric acid, lithium values from a strongly acidic cation exchange resin having lithium absorbed thereon following the procedure of U.S. Patent 2,980,499. The aqueous mixture was maintained at a temperature of from about 80 to about 85 degrees centigrade. After fifteen minutes residence time, the lithium fluoride precipitate was filtered off, washed with water and dried.

Analysis was made of the lithium fluoride product of the present invention by X-ray diffraction. The product was found to be substantially all lithium fluoride, any impurities present were in trace amounts, undetectable by X-ray diffraction.

*Example 2*

For the sodium silicofluoride used in Example 1 above, fluosilicic acid, potassium silicofluoride, ammonium silicofluoride and the like may be substituted as sources of fluoride ion. For the sodium hydroxide used in the above Example 1, ammonium hydroxide, potassium hydroxide, potassium carbonate, sodium carbonate and the like may be substituted with substantially similar results.

Lithium sulfate was used in Example 1 to approximate the solution obtained when a strongly acidic cation exchange resin is eluted with sulfuric acid to obtain the lithium value. For the sulfuric acid used to elute lithium value from the cation exchange resin, hydrochloric, hydrobromic, hydriodic or nitric acids, or potassium hydroxide or sodium hydroxide may be substituted with substantially similar results. The solution obtained will contain the lithium salt or hydroxide corresponding to the acid or base used in the elution steps.

When the above susbtitutions are made, a lithium fluoride product having substantially the same characteristics as that described in Example 1 is obtained.

Various modifications may be made in the present invention without departing from the spirit or scope thereof, and it is to be understood that I limit myself only as defined in the appended claims.

I claim:

1. A method of producing substantially pure lithium fluoride which comprises, (1) providing an aqueous solution of a soluble silicofluoride, hydrolyzing, while maintaining at a temperature of from about 50 degrees centigrade to the boiling point at the pressure employed, said silicofluoride solution by adding thereto sufficient base to give a mixture having a pH of from about 9.3 to about 10.6, whereby silica is caused to precipitate, and separating the silica thereby leaving an aqueous solution containing fluoride ions; (2) providing an aqueous solution containing lithium ions; (3) mixing said aqueous fluoride ion containing solution with said aqueous lithium ion containing solution, while maintaining the mixture thus formed at a temperature of from about 50 degrees centigrade to the boiling point at the pressure employed, in an amount sufficient to provide an amount of fluoride ion in the mixture of from about 5 to about 15 percent in excess of the stoichiometric amount required to react with the lithium ion present, whereby a precipitate of lithium fluoride is formed; and (4) recovering said lithium fluoride precipitate from said mixture, said lithium fluoride having a purity such that impurities are undetectable by X-ray diffraction.

2. A method of producing substantially pure lithium fluoride which comprises, (1) providing an aqueous solution of a soluble silicofluoride, hydrolyzing, while maintaining at a temperature of from about 80 to about 85 degrees centigrade, said silicofluoride solution by adding thereto sufficient base to give a mixture having a pH of from about 9.3 to about 10.6, whereby silica is caused to precipitate, and separating the silica thereby leaving an aqueous solution containing fluoride ions; (2) providing an aqueous solution containing lithium ions; (3) mixing said aqueous fluoride ion containing solution with said aqueous lithium ion containing solution, while maintaining the mixture thus formed at a temperature of from about 80 to about 85 degrees centigrade, in an amount sufficient to provide an amount of fluoride ion in the mixture of from about 5 to about 15 percent in excess of the stoichiometric amount required to react with the lithium ion present, whereby a precipitate of lithium fluoride is formed; and (4) recovering said lithium fluoride precipitate from said mixture, said lithium fluoride having a purity such that impurities are undetectable by X-ray diffraction.

3. A method of producing substantially pure lithium fluoride which comprises, (1) providing an aqueous solution of sodium silicofluoride, hydrolyzing, while maintaining at a temperature of from about 50 degrees centigrade to the boiling point at the pressure employed, said silicofluoride solution by adding thereto sufficient sodium hydroxide to give a mixture having a pH of from about 9.3 to about 10.6, whereby silica is caused to precipitate, and separating the silica thereby leaving an aqueous solution containing fluoride ions; (2) providing an aqueous solution containing lithium ions; (3) mixing said aqueous fluoride ion containing solution with said aqueous lithium ion containing solution, while maintaining the mixture thus formed at a temperature of from about 50 degrees centigrade to the boiling point at the pressure employed, in an amount sufficient to provide an amount of fluoride ion in the mixture of from about 5 to about 15 percent in excess of the stoichiometric amount required to react with the lithium ion present, whereby a precipitate of lithium fluoride is formed, and (4) recovering said lithium fluoride precipitate from said mixture, said lithium fluoride having a purity such that impurities are undetectable by X-ray diffraction.

4. A method of producing substantially pure lithium fluoride which comprises, (1) providing an aqueous solution of sodium silicofluoride, hydrolyzing, while maintaining at a temperature of from about 80 to about 85 degrees centigrade, said silicofluoride solution by adding thereto sufficient sodium hydroxide to give a mixture having a pH of from about 9.3 to about 10.6, whereby silica is caused to precipitate, and separating the silica thereby leaving an aqueous solution containing fluoride ions; (2) providing an aqueous solution containing lithium ions; (3) mixing said aqueous fluoride ion containing solution with said aqueous lithium ion containing solution, while maintaining the mixture thus formed at a temperature of from about 80 to about 85 degrees centigrade, in an amount sufficient to provide an amount of fluoride ion in the mixture of from about 5 to about 15 percent in excess of the stoichiometric amount required to react with the lithium ion present, whereby a precipitate of lithium fluoride is formed, and (4) recovering said lithium fluoride precipitate from said mixture, said lithium fluoride having a purity such that impurities are undetectable by X-ray diffraction.

5. A method of producing substantially pure lithium fluoride which comprises, (1) providing an aqueous solution of sodium silicofluoride, hydrolyzing, while maintaining at a temperature of from about 80 to about 85 degrees centigrade, said silicofluoride solution by adding thereto sufficient aqueous sodium hydroxide solution to give a mixture having a pH of from about 9.3 to about 10.6, whereby silica is caused to precipitate, and separating the silica thereby leaving an aqueous solution containing fluoride ions, (2) providing an aqueous solution containing lithium ions, (3) mixing said aqueous fluoride ion containing solution with said aqueous lithium ion containing solution, while maintaining the mixture thus formed at a temperature of from about 80 to about 85 degrees centigrade, in an amount sufficient to provide an amount of fluoride ion in the mixture of from about 5 to about 15 percent in excess of the stoichiometric amount required to react with the lithium ion present, whereby a precipitate of lithium fluoride is formed, and (4) recovering said lithium fluoride precipitate from said mixture, said lithium fluoride having a purity such that impurities are undetectable by X-ray diffraction.

References Cited by the Examiner

UNITED STATES PATENTS

| | | | |
|---|---|---|---|
| 2,584,895 | 2/52 | MacIntyre | 23—88 |
| 2,840,453 | 6/58 | Dwyer | 23—88 X |
| 2,980,499 | 4/61 | Goodenough et al. | 23—32 |
| 3,000,702 | 9/61 | Cunningham | 23—88 |
| 3,024,086 | 3/62 | Cines | 23—88 |
| 3,132,922 | 5/64 | Goodenough et al. | 23—154 X |

FOREIGN PATENTS 1,010,504 6/57 Germany.

MAURICE A. BRINDISI, *Primary Examiner.*